United States Patent [19]
Charboneau et al.

[11] Patent Number: 5,486,976
[45] Date of Patent: Jan. 23, 1996

[54] PRESSURE TRANSDUCER APPARATUS HAVING A RIGID MEMBER EXTENDING BETWEEN DIAPHRAGMS

[75] Inventors: Thomas J. Charboneau, Plainville; Douglas B. Strott, Attleboro; Dale R. Sogge, Wrentham; Thomas R. Maher, Plainville, all of Mass.

[73] Assignee: Texas Instruments Incorporated, Dallas, Tex.

[21] Appl. No.: 339,040

[22] Filed: Nov. 14, 1994

[51] Int. Cl.$^6$ ............................. H01G 7/00; G01L 9/12
[52] U.S. Cl. ............................................ 361/283.4; 73/724
[58] Field of Search .................. 73/718, 724; 361/283.1, 361/283.2, 283.3, 283.4

[56] References Cited

U.S. PATENT DOCUMENTS

| | | |
|---|---|---|
| 4,507,973 | 4/1985 | Barr et al. ................................. 73/724 |
| 4,523,474 | 6/1985 | Browne et al. ........................... 73/724 |
| 4,680,971 | 6/1987 | Kavli et al. |
| 4,716,492 | 12/1987 | Charboneau et al. |
| 5,189,916 | 3/1993 | Mizumoto et al. |
| 5,214,961 | 6/1993 | Kojima et al. |

OTHER PUBLICATIONS

Copending Application Ser. No.: 08/339,039 Filed: Nov. 14, 1994 Title: Pressure Transducer Apparatus And Method For Making Same Inventor(s): Stanley J. Lukasiewiez et al.

*Primary Examiner*—Bot L. Ledynh
*Attorney, Agent, or Firm*—Russell E. Baumann; Richard L. Donaldson; René E. Grossman

[57] ABSTRACT

A monolithic capacitive differential pressure transducer (68, 156, 170) is shown composed of ceramic material having first and second cavities formed adjacent to opposed face surfaces to form first and second flexible diaphragms (70, 72; 110, 140; 172, 174) and a motion transfer pin (74, 124/130, 202) attached to and extending between the diaphragms. Capacitor plates are disposed on opposed rigid platform members (76, 78; 100, 126; 184, 194). Component parts are first pressed from ceramic powder and assembled into a unit using one of several methods including a selected amount of pressure to press them together or using a combination of low pressure along with raising the temperature of the material to soften the binder in the ceramic material at surfaces of the parts which are to be joined together. Selected gaps, both along the x-y direction and along the z direction may be obtained using consumable spacer material which is sublimated in a debinderization cycle prior to sintering of the unit to form a monolithic body.

10 Claims, 5 Drawing Sheets

5,486,976

PRESSURE TRANSDUCER APPARATUS HAVING A RIGID MEMBER EXTENDING BETWEEN DIAPHRAGMS

BACKGROUND OF THE INVENTION

This invention relates generally to pressure sensors and more particularly to pressure responsive variable parallel plate capacitive transducers. Such transducers are shown and described, for example, in U.S. Pat. No. 4,716,492, assigned to the assignee of the present invention. A capacitive transducer is shown in the patent having a thin ceramic diaphragm mounted in closely spaced, sealed, overlying relation on a ceramic base, with metal coatings deposited on respective opposing surfaces of the diaphragm and the base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A cup-shaped connector body of electrical insulating material is fitted over the electrical circuit and is secured to the transducer by a housing sleeve which has a port for exposing the transducer diaphragm to an applied fluid pressure. The diaphragm is movable in response to variations in pressure applied to the diaphragm to vary the capacitance of the capacitor and the electrical circuit provides an electrical output signal corresponding to the applied pressure.

In copending, coassigned patent application Ser. No. 07/972,680 filed Nov. 6, 1992, a capacitive pressure transducer is shown and described in which metal capacitor plates are disposed on opposite sides of two surfaces defining a cavity or gap formed closely adjacent an outer surface of a monolithic ceramic body. The ceramic comprises conventional material, such as alumina, provided in powdered form coated with an organic binder pressed into first and second portions, i.e., a diaphragm and a base having a recess formed in an outer face surface, by pressing the powder in a die. Metallized coatings are deposited as by screen printing a thick film paste on one surface of the diaphragm portion and on the recessed outer face surface of the base portion. The vehicle used in the thick film paste is then removed as by heating. A spacer of organic material may be placed in the recess to ensure that the cavity gap is maintained during the pressing step. The two portions are then pressed together to form a single unit and then the unit is heated to a first debinderizing temperature. After the organics, including the spacer means, are vaporized/decomposed and released through still open cells of the ceramic, the unit is placed in a high temperature oven and co-fired in a reducing atmosphere with the metal layers forming a conductive coating bonded to the ceramic and the ceramic being sintered together to form a monolithic, closed cell body. In a modified embodiment, low temperature ceramic materials are used for the ceramic which can be sintered at a temperature low enough to permit use of conventional printed circuit inks fired in an air atmosphere. Copending, coassigned application Ser. No. 08/339,039 (Attorney Docket No. A40285) discloses and claims improved structures and methods including monolithic differential pressure sensor in which two flexible diaphragms are connected by a force transfer pin. Differential pressure sensors of this type however, typically have an output error caused by common mode pressure exposed to both flexible diaphragms. That is, when the diaphragms are exposed to a particular pressure greater than zero, the diaphragms flex inwardly causing the sensing element, e.g., a capacitor sensing plate, to provide an output signal indicative of movement even though the net force on the transfer pin is zero.

SUMMARY OF THE INVENTION

It is an object of the invention to provide differential pressure transducers which do not have errors caused by common mode pressure.

Briefly, in accordance with the invention, an improved differential capacitive pressure transducer is provided by forming a first rigid laterally extending platform on a motion transfer pin extending between opposed diaphragms forming a movable platform and a second rigid laterally extending platform on a rigid annular body spaced from but overlapping the first platform forming a stationary platform. Capacitor plates are disposed on the platform which are maintained in planes parallel with one another as the diaphragms flex when exposed to differential pressure. According to a feature of this embodiment, first and second capacitor plates are formed on the second stationary platform with appropriate conductive vias and terminal pins attached to the respective plates and a common plate is formed on the first movable platform overlying the first and second plates.

BRIEF DESCRIPTION OF THE DRAWINGS

Other objects, advantages and details of the novel and improved transducers of the invention and method of making appear in the following detailed description of preferred embodiments of the invention, the detailed description referring to the drawings in which.

Figure 1:
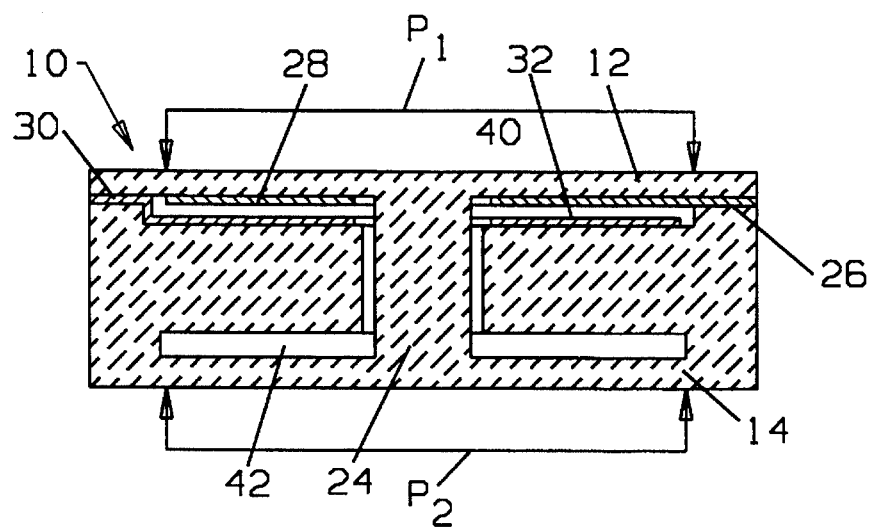
FIG. 1 is a cross sectional view of a monolithic differential pressure capacitive transducer.
Figure 2:
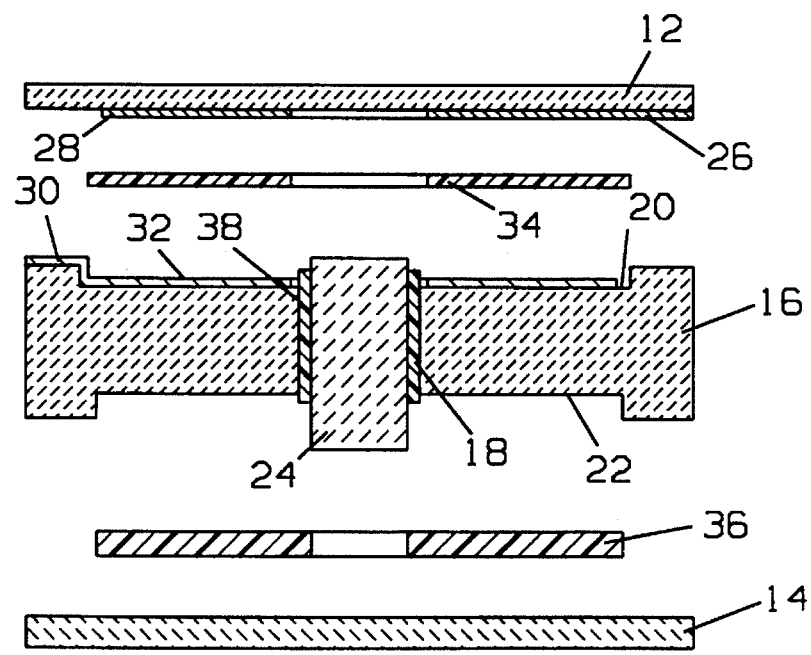
FIG. 2 is a cross sectional, exploded view of green ceramic component parts and consumable spacers used in making the FIG. 1 transducer.

With particular reference to FIGS. 1 and 2 of the drawings, a differential pressure responsive, variable capacitive transducer comprises a monolithic body of ceramic material having first and second cavities formed therein closely adjacent respective opposed first and second outer surfaces of the body with a bore extending between the cavities. A motion transfer pin is slidably disposed within the bore and has opposite ends attached to the respective diaphragms. Capacitor plates formed of suitable material, such as metal, are disposed on opposed surfaces of each of the cavities with vias extending from the plates to respective terminal pads for connection to externally disposed signal conditioning electrical circuitry (not shown).

Although various ceramic materials can be utilized such as cordierite, mullite, etc., a suitable composition comprises between approximately 80% by weight up to essentially 100% alumina with the balance being additives which form a glass at the sintering temperature of the alumina. Such material is conventional in the electronic substrate industry and can be either purchased as a spray dried powder ready to press or can be specifically formulated and spray dried according to known techniques to produce a free-flowing, granulated powder ready for pressing. The spray dried powder contains the alumina and an organic binder such as polyvinyl alcohol or other plastic to serve as a temporary adhesive holding the powder together after pressing until the resultant pressed material is sintered.

Using a pressure in the range of approximately 1,000–30,000 psi, the alumina spray dried powder is pressed into the shapes of first and second generally cylindrical diaphragms 12, 14, and a generally cylindrical base 16 having a centrally disposed bore 18 formed therethrough with first and second recesses 20, 22 formed in opposed face surfaces of the base. The alumina powder is also pressed into a generally cylindrical motion transfer pin 24. The recesses 20, 22 have a suitable selected depth of generally between 0.001 to 0.010 inches. Although it is convenient to form the recesses in base 16, they could be formed wholly or partially in diaphragm 12, 14 as well. The depth of the recesses is selected to allow for shrinkage of the materials upon sintering to provide spacing between capacitor plates applied to the bottom of the recesses and the inner surface of the diaphragm from approximately 0.5 to 2.5 mils in the finished transducer.

After the initial pressing, the green ceramic components are strong enough to permit handling. Selected electrode patterns 26, 30 are applied respectively to the bottom surfaces of at least one of the diaphragms 12, 14 and the respective outer surfaces of base 16 by any suitable means, such as screen printing. Any suitable high temperature metal can be used such as tungsten, molybdenum, platinum or other high temperature materials such as conductive ceramic. For screen printing the metallization is applied in the form of conventional thick film paste which typically contains certain solvents to adjust viscosity for screen printing. After application, the solvents can be removed slowly at room temperature or more rapidly by placing the parts into an oven at approximately 100° C.

Although it is possible to press the diaphragms and base together without any spacing means placed therebetween and still maintain gaps along the x-y direction between the diaphragms and the bottom of the recessed areas, particularly with relatively large gaps, it is preferred to use a fugitive spacer, particularly with relatively smaller gaps. A spacer helps to maintain the separation between electrodes 28, 32 and prevent the electrodes from engaging one another when the diaphragms are pressed to the base. Annular fugitive spacer elements 34, 36 composed of essentially non-compressible, consumable or decomposable material each having a thickness preferably essentially equal to the desired spacing between the electrodes or a plurality of sheets of such material the total thickness of which preferably essentially equals the desired spacing are preferably placed in respective recesses 20, 22. The spacer material is selected so that it is clean burning, i.e., so that there is no ash remaining after the spaces have been thermally removed after pressing the base and the diaphragms together. Polypropylene carbonate and Delrin, a trademark of E. I. du Pont de Nemours Company for acetal, thermoplastic resin are two such materials, and can be used in various thicknesses depending upon the desired gap.

A gap along the z direction, between the surface of bore 18 and motion transfer pin 24 is provided by coating, as by brushing, spraying or dipping, the cylindrical surface of pin 24 and/or the surface of bore 18 with a solution of consumable material such as Q-Pac 40M, a trademark of Pac Polymers Incorporated for polypropylene carbonate and a suitable solvent such as caprolactone or acetone. When the solvent evaporates a thin film 38 of the polypropylene carbonate remains. When the assembly of parts is pressed together pin 24 and the surface of bore 18 are separated by the consumable spacer material.

The component parts, including the consumable spacers, are then placed into a die or suitable isostatic press and pressed together using a pressure in a range between approximately 1,000 and 30,000 psi.

The diaphragms, pin and base, now pressed together to form a single body or unit is placed in an oven and heated in an air atmosphere at relatively low temperatures, e g., 300° C. in order to evaporate and burn out the binders and spacer material and allow the evaporated matter and combustion gases to pass through the pores of the body before the body is sintered and the pores closed. The temperature is limited by the maximum temperature at which the metallization can be heated in an air or oxygen atmosphere without significant oxidation.

After removing as much as possible of the organic binder and the spacer material during the debinderizing operation, the assembled unit is placed into a high temperature furnace and sintered in the range of approximately 1400°–1700° C. in a reducing atmosphere. Typically, the atmosphere contains approximately 1–100% hydrogen or dissociated ammonia with the balance usually nitrogen.

After the unit has been fired electrical connection means are added as by attaching pins to the metallized vias with conductive epoxy. Any suitable notches, bores or the like to provide access to the vias can be provided during the original pressing steps.

Device 10 can also be formed utilizing relatively low temperature materials such as alumina, silica or other conventional material and a glass binder used in making electronic substrates which can be sintered at temperatures such as 700°–1000° C. in air with standard thick film inks for metallization, such as silver, palladium, gold, copper and the like. For example, Electro-Science Laboratories, Inc. ceramic powder D101 comprising approximately 60% weight percent ceramic powder and 40 weight percent glass mixed with a suitable binder such as Duramax (a trademark of Rohm and Haas Company) B-1037 binder material can be used. The binder material in the form of a colloidal dispersion along with the ceramic powder is added to a mill and thoroughly mixed and then spray dried in a conventional manner. The B-1037 binder has a glass transition point of approximately 22° C. The spray dried powder can be pressed into desired configurations, suitable electrical traces of silver or other low temperature electrically conductive material screen printed on the green pressed parts and the parts assembled together using sufficient heat to raise the temperature of the binder contiguous to the surfaces to be joined to a sufficient level to soften the binder, e.g., 70° C. and a force sufficiently low to prevent any significant reflow of the green ceramic material, in the order of 200–400 psi. Once the parts are adhered together the device can be sintered at 700°–1000° C. in an air atmosphere.

In using such assembly techniques in which the force required to effect adherence of the parts without causing reflow of the green ceramic component parts, spacer material may be obviated when the designed gaps are sufficiently large, i.e., gaps of more than a few mils particularly if there are no closely controlled critical dimensions. For example, in device 10, bore 18 could be made significantly larger, on the order of 25-30 mils, to obviate the need for spacer material 38.

In use, diaphragm portion 12 is exposed to a first pressure $P_1$ and diaphragm portion 14 is exposed to a second pressure $P_2$. The diaphragm portions flex and motion transfer pin portion 24 moves in dependence upon the difference between pressures $P_1$ and $P_2$ which in turn changes the gap between the respective pairs of capacitor plates.

The above described differential pressure transducers are useful in many applications; however, they are subject to a so-called common mode characteristic since the diaphragm portions and concomitantly the movable capacitor plate can move independently of the motion transfer pin thereby changing the capacitance signal. For example, at pressures greater than zero even if $P_1$ is the same as $P_2$, the gap between the capacitor plates change due to the flexing of the diaphragms even though there is no net force on the transfer pin.

Figure 3:
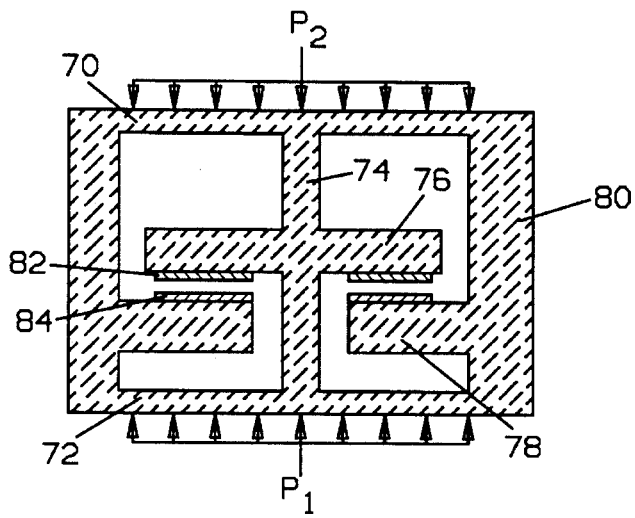
FIG. 3 is a cross sectional view of a monolithic differential pressure transducer made in accordance with the invention.
Figure 5:
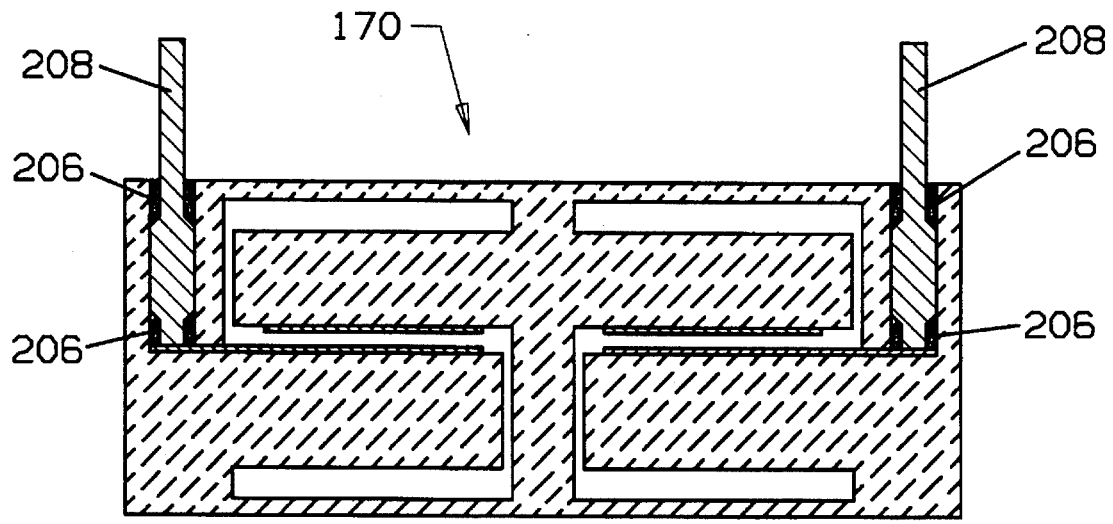
FIG. 5 is a cross sectional view of a monolithic differential pressure capacitor transducer made in accordance with a modified embodiment of the invention.

Transducers made in accordance with the invention as shown in FIGS. 3 and 5 are particularly advantageous in that they are not subject to this limitation as will be explained below. With particular reference to FIG. 3 a differential pressure transducer 68 is shown comprising first and second diaphragm portions 70, 72 interconnected by motion transfer pin 74. A first rigid platform 76 extends laterally from pin 74 while a second rigid platform 78 extends laterally from rigid tubular or annular body 80. Platform 78 is spaced from and overlaps platform 76 to provide a selected gap therebetween. Capacitor plates 82, 84 are respectively disposed on the surfaces of the platforms facing each other. It will be seen that even though diaphragm portions may flex independently of pin 74 that there is no change in the gap between the capacitor plates until pin 74 moves due to a pressure differential between pressure $P_2$ applied to diaphragm portion 70 and pressure $P_1$ applied to diaphragm 72.

Although transducer 68 can be made of discrete components assembled together, a transducer of this type can also be made as a monolithic body as shown in FIGS. 4a–4l.

Figure 4A:
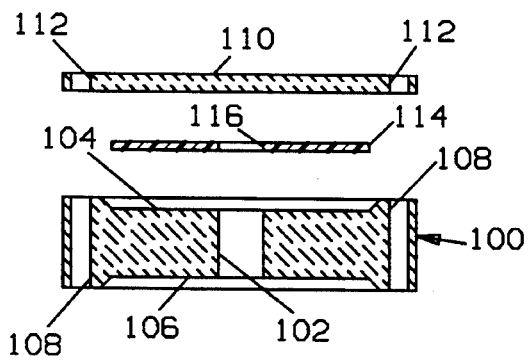
FIGS. 4a–4j are cross sectional views of green ceramic component parts and consumable spacers depicting various steps in making a transducer similar to the FIG. 3 transducer.
Figure 4B:
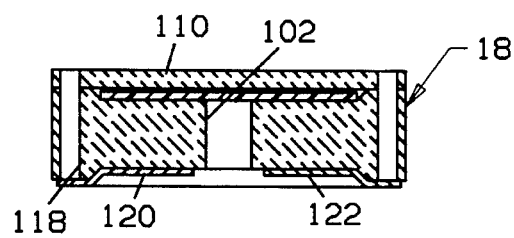

As seen in FIG. 4a a first generally cylindrical substrate 100 is green pressed from spray dried ceramic powder with a centrally disposed bore 102 formed therethrough and aligned recesses 104, 106 formed on opposite face surfaces of the substrate. A pair of terminal bores 108 are also formed through substrate 100 adjacent the outer periphery and radially beyond the recesses. A diaphragm 110 having an outer periphery matching that of substrate 100 and terminal bores 112 positioned to be in alignment with bores 108 is also green pressed. A spacer 114 of consumable material having a central aperture 116 generally matching bore 102 is placed in recess 104 and the parts are pressed together to form a first sub-assembly 118 (FIG. 4b) with sufficient force to cause them to adhere to one another, typically approximately 10,000 psi. Metallization 120, 122 is screen printed on the bottom surface of subassembly 118 including recess 106, to form capacitor plates as will be described below particularly with reference to FIGS. 4k and 4l.

Figure 4C:
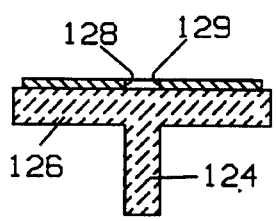
Figure 4D:
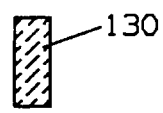

As shown in FIG. 4c, ceramic powder is pressed to form a generally cylindrical plate 126 with a pin 124 extending from a central location of plate 126. A layer 128 of metallization with a central opening 129 is screen printed on the top face surface of plate 126. Ceramic powder is pressed into a separate pin 130 as shown in FIG. 4d.

Figure 4E:
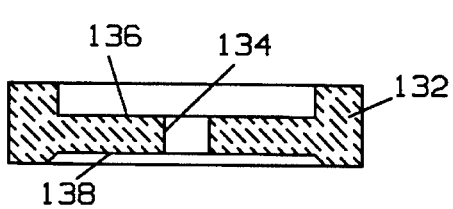
Figure 4F:
Figure 4G:
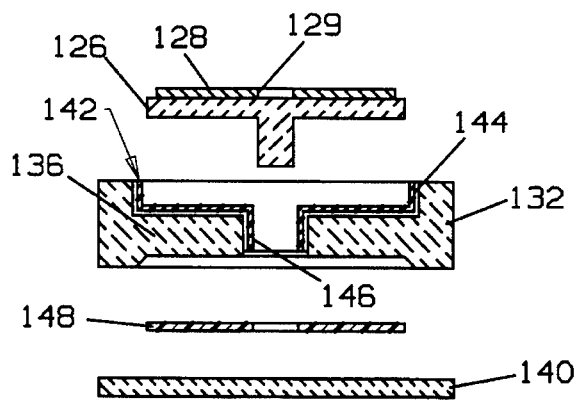
Figure 4H:
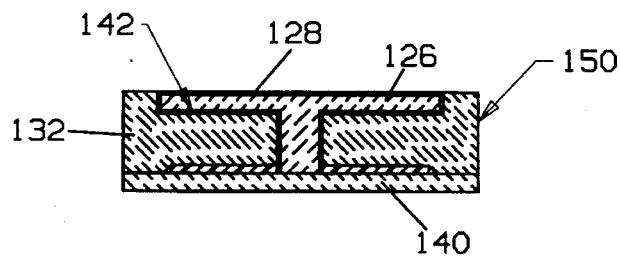

With reference to FIG. 4e, a second, generally cylindrical, substrate 132 is formed from the ceramic powder with a centrally disposed bore 134 between opposite face surfaces and with a first recess 136 having sufficient depth to accommodate plate 126 along with spacer means to be described below, and a second recess 138 on the opposed face surface of substrate 132. Recess 138 has a depth comparable with recess 104 in substrate 100. The ceramic powder is also pressed into diaphragm 140 having an outer periphery matching that of substrate 132 and a thickness preferably the same as diaphragm 110. Plate 126 is placed in recess 136 of substrate 132 with a consumable spacer 142 placed therebetween. Spacer 142 has an upstanding wall portion 144 to separate the outer periphery of plate 126 from the sidewall defining recess 136 and a downwardly depending wall 146 to separate the outer periphery of pin portion 124 from the sidewall of the bore 134. A consumable spacer 148 is placed in recess 138 and diaphragm 140 is placed on the bottom face surface of substrate 132 and over spacer 148 and the parts are pressed together to form a second sub-assembly 150 as shown in FIG. 4h.

Figure 4I:
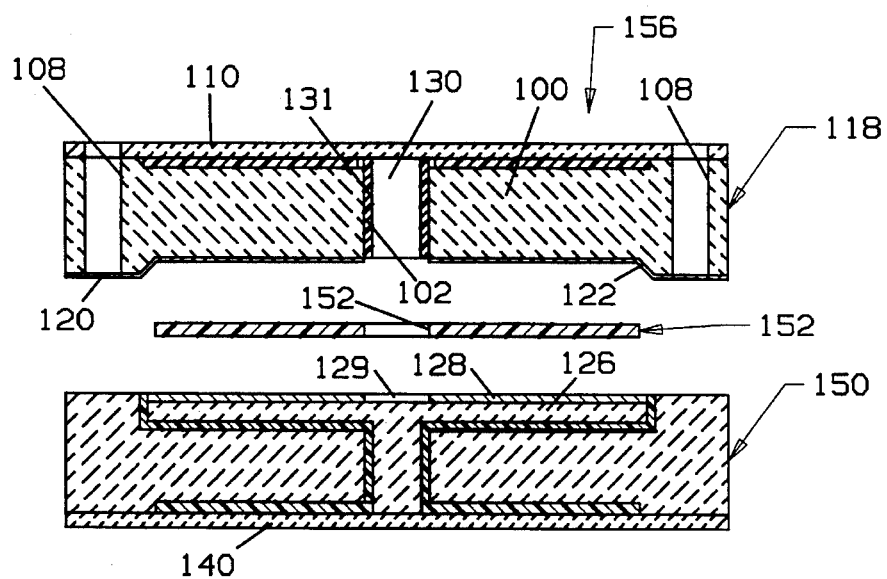
Figure 4J:
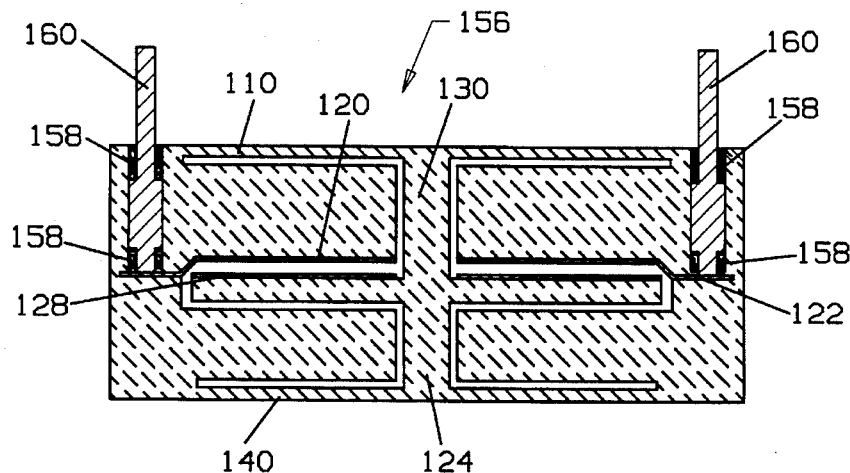

Pin 130 is placed in bore 102 with consumable spacer material 131 placed about its outer cylindrical surface and then sub-assemblies 118 and 150 shown in FIG. 4i are pressed together with a consumable spacer 152 disposed in recess 106 to form assembly 156. Spacer 152 has a centrally located aperture 154 so that pin 130 can engage the top surface of plate 126 through an opening 129 formed in metallization layer 128. Assembly 156 is then heated to remove the organic binder and spacer material and sintered as in the embodiments previously described to form a monolithic body.

Suitable conductive material 158, such as silver loaded epoxy, is inserted in bores 108 along with terminal pins 160 to make electrical connection with the metal conductors formed by metallization layers 120, 122.

Figure 4K:
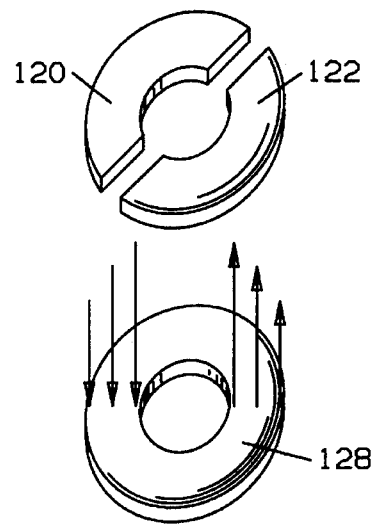
FIG. 4k is a perspective view of the capacitor plates employed in the FIGS. 3 and 4j transducer.
Figure 4L:
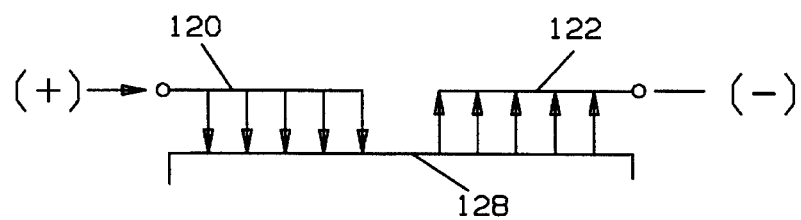
FIG. 4l is a schematic representation of the electrical arrangement of the FIG. 4k capacitor plates.

Due to the fact that the capacitor plates formed by metallization layer 128 moves along with pin portion 124/130, layer 128 is used as a common plate for separate plates formed from metallization layers 120, 122 to function as two capacitors connected in series relation, see FIGS. 4k and 4l. Since plates 120, 122 are mounted on a rigid platform attached to the main body portion of the transducer and common plate 128 is mounted on a rigid platform attached to pin portions 124/130 the only change in the gap between the plates is caused by flexing of the diaphragms caused by differential pressure causing rectilinear movement of the pin portions with the planes in which the plates lie maintaining a parallel relationship with one another.

Figure 6:
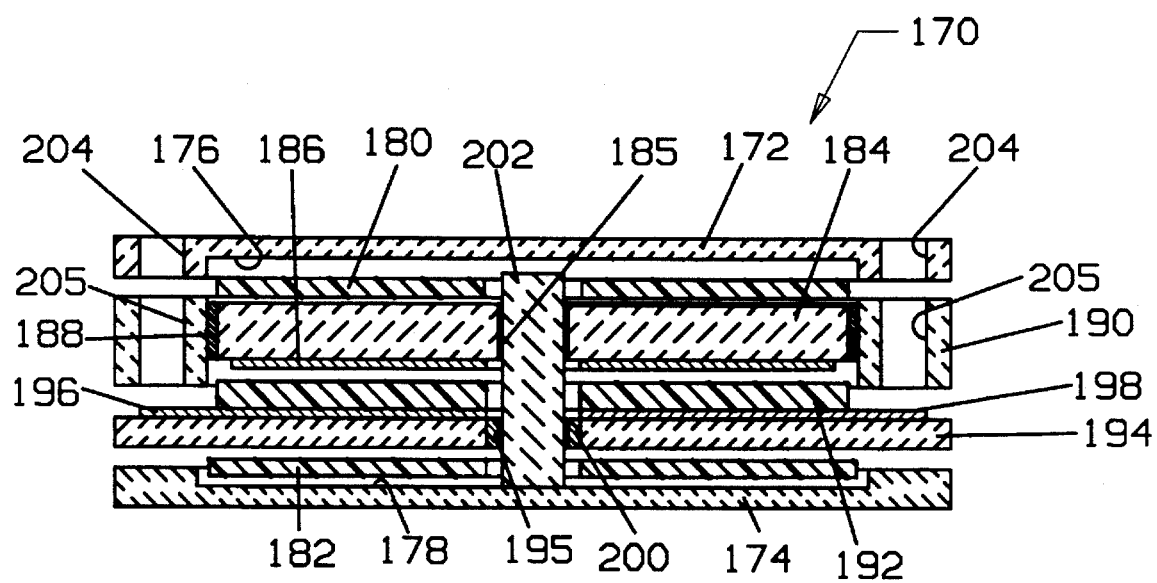
FIG. 6 is a cross sectional exploded view of green ceramic component parts and consumable spacers used in making the FIG. 5 transducer.

FIGS. 5 and 6 illustrate a modified embodiment and method for making a differential pressure capacitive pressure transducer 170 in which the capacitor plates are mounted on rigid platforms. As seen in FIG. 6, the green pressed diaphragms 172, 174 are each formed with a respective centrally disposed recess 176, 178 adapted to receive respective annular consumable spacer elements 180, 182. A first annular substrate member 184 after being pressed from the ceramic material has a metallized layer 186 applied on its lower face surface and a solution of consumable material 188 coated on its outer peripheral surface. Substrate member 184 is adapted to be closely received in but separated by spacer material 188 from a ring 190 pressed from the ceramic. The central bore 185 of member 184 has a diameter closely matching that of a pin 202 to be described below so that they will form an integral connection when the several parts are pressed together and sintered. Ring 190 has a greater height than substrate member 188 to effectively form a recess for reception of consumable spacer 192. A second substrate member 194 having a centrally disposed bore 195, after being pressed, is provided with metallized layers 196, 198 to form the split capacitor plates in the manner described relative to transducer 156 and has a solution 200 of consumable spacer material coated on the surface of bore 195. A pin 202, pressed from the ceramic material is placed within the central opening of the annular members and closely received in bore 195 but separated therefrom by spacer material 200. Terminal pin bores 204 are provided in diaphragm portion 172 spaced radially outwardly of recess 176 and aligned with terminal pin bores 205 in ring member 190 to provide access to metallized layers 196, 198 respectively. The several parts can be conveniently placed within a die cavity and pressed together sufficiently to adhere to one another, or as mentioned above, could be assembled using low force techniques and obviate the need for consumable spacers, for example, by heating the several parts to soften the binder and then using low force, on the order of 200–400 psi being joined together. Following the debinderization and sintering cycles, conductive epoxy 206 and terminal pins 208 can be inserted in bores 204 to complete the assembly.

It should be understood that though preferred pressure responsive capacitive transducer embodiments of the invention have been described by way of illustrating the invention, this invention includes all modifications and equivalents of the disclosed embodiments falling within the scope of the appended claims. For example, it will be appreciated that means other than variable capacitor plates can be used to sense movement of the platforms including magnetic, optical, electrostatic and the like.

What is claimed:

1. A pressure responsive capacitive transducer comprising a generally rigid, annular wall extending along a longitudinal axis forming an opening between first and second ends, first and second relatively thin, flexible diaphragms closing the first and second ends of the annular wall respectively, a rigid pin attached to and extending between a central portion of the first and second diaphragms, a first rigid platform connected to the pin and extending laterally outwardly from the pin toward the annular wall but spaced therefrom, a second rigid platform connected to the annular wall and extending laterally inwardly from the annular wall toward the pin but spaced therefrom and spaced a selected distance along the longitudinal axis from the first platform, the platforms having surface portions aligned with and facing each other with a selected gap between the platforms, first and second electrical capacitor plates disposed on the surface portions of the first and second platforms, and means to provide an electrical connection with the capacitor plates.

2. A pressure responsive capacitor transducer according to claim 1 in which the capacitor plate on the second platform comprises first and second portions spaced from one another and an electrical lead extends from each portion through the transducer.

3. A pressure responsive capacitive transducer comprising a monolithic body having a rigid sidewall and having first and second open end portions, a flexible diaphragm disposed at and closing each end portion, a motion transfer pin extending between a central portion of the diaphragms at the first and second end portions, a first rigid platform extending laterally from the motion transfer pin, and a second rigid platform extending laterally from the rigid sidewall, the platforms having surface portions aligned with and facing each other with a selected gap between the platforms, first and second electrical capacitor plates disposed on the surface portions of the first and second platforms and means to electrically energize the capacitor plates.

4. A pressure responsive transducer according to claim 3 in which the body, the flexible diaphragms, the pin and the first and second platforms, taken together, are monolithic ceramic material.

5. A pressure responsive transducer according to claim 3 in which the electrical capacitor plate on the second platform comprises first and second portions spaced from one another and the electrical capacitor plate on the first platform is aligned with both first and second portions.

6. A pressure responsive transducer according to claim 5 in which an electrical lead extends from each of the first and second portions of the capacitor plate on the second platform.

7. A pressure responsive transducer comprising a generally rigid, annular wall extending along a longitudinal axis forming an opening between first and second ends, first and second relatively thin, flexible diaphragms closing the first and second ends of the annular wall respectively, a rigid member attached to and extending between a central portion of the first and second diaphragms, a first rigid platform connected to the member and extending laterally outwardly from the member toward the annular wall but spaced therefrom, a second rigid platform connected to the annular wall and extending laterally inwardly from the annular wall toward the member, signal means responsive to movement of the first and second platforms for producing an electrical signal upon such movement, and means to provide an electrical connection with the signal means.

8. A pressure responsive transducer according to claim 7 in which signal means comprises first and second capacitor plates disposed respectively on a surface portion of the first and second rigid platforms.

9. A pressure responsive transducer according to claim 7 in which the signal means comprises first and second capacitor plates disposed respectively on a surface portion of the first and second rigid platforms, the second capacitor plate disposed on the second rigid platform connected to the annular wall comprising first and second portions spaced from one another and an electrical lead extends from each portion through the transducer.

10. A pressure responsive transducer according to claim 7 in which the annular wall, the first and second diaphragms and the rigid member are monolithic.

\* \* \* \* \*